United States Patent
Kalmanek, Jr. et al.

(10) Patent No.: US 7,599,373 B1
(45) Date of Patent: Oct. 6, 2009

(54) METHOD AND APPARATUS FOR AUTOMATED PROVISIONING FOR CUSTOMER PREMISES TRANSPORT EQUIPMENT

(75) Inventors: Charles R. Kalmanek, Jr., Short Hill, NJ (US); Kadangode K. Ramakrishnan, Berkeley Heights, NJ (US); Robert Duncan Doverspike, Tinton Falls, NJ (US); Miguel Rafael Martinez-Heath, Middletown, NJ (US); David H. Yang, Marlboro, NJ (US)

(73) Assignee: AT&T Corp., New York, NY (US)

( * ) Notice: Subject to any disclaimer, the term of this patent is extended or adjusted under 35 U.S.C. 154(b) by 940 days.

(21) Appl. No.: 10/894,418

(22) Filed: Jul. 19, 2004

Related U.S. Application Data

(60) Provisional application No. 60/487,910, filed on Jul. 17, 2003.

(51) Int. Cl.
*H04L 12/28* (2006.01)

(52) U.S. Cl. .................. 370/395.1; 370/392; 370/395.5; 370/466

(58) Field of Classification Search ............... 370/392, 370/465, 230, 466
See application file for complete search history.

(56) References Cited

U.S. PATENT DOCUMENTS

| | | | |
|---|---|---|---|
| 6,577,642 B1 * | 6/2003 | Fijolek et al. | 370/465 |
| 6,714,545 B1 * | 3/2004 | Hugenberg et al. | 370/395.1 |
| 2004/0170173 A1 * | 9/2004 | Pan et al. | 370/392 |
| 2004/0190548 A1 * | 9/2004 | Harel et al. | 370/466 |
| 2005/0018605 A1 * | 1/2005 | Foote et al. | 370/230 |

* cited by examiner

*Primary Examiner*—Simon Sing
*Assistant Examiner*—Simon King

(57) ABSTRACT

Method and apparatus for automated provisioning for customer premises transport equipment supporting both circuit and packet traffic.

5 Claims, 4 Drawing Sheets

METHOD AND APPARATUS FOR AUTOMATED PROVISIONING FOR CUSTOMER PREMISES TRANSPORT EQUIPMENT

This application claims the benefit of U.S. Provisional Application No. 60/487,910 filed on Jul. 17, 2003, which is herein incorporated by reference.

The present invention relates generally to communication networks and, more particularly, to a method and apparatus for automated provisioning for customer premises transport equipment supporting both circuit and packet traffic.

BACKGROUND OF THE INVENTION

The traditional processes for provisioning, installation, test and turn-up of transport equipment on customer premises (known as customer premise(s) equipment CPE) are complex, often involving coordination between the customer or an installer, and a network operator that uses one or more operations support systems (OSSs) to provision the customer premise and network equipment, initiate tests and activate the service. In addition, the OSSs that support this activity are typically developed by and customized for the specific vendor equipment that is deployed on customer premise and in the network. Developing new OSSs is a time consuming and expensive process for network service providers. This situation makes it difficult for network service providers to deploy new types of customer premise equipment, since each new customer premise equipment type typically requires new software development in the OSSs. In addition, the provisioning, installation, test and turn-up process itself is slow and expensive due to the complexity of the processes described above.

Transport equipment and OSS have traditionally not been developed to support a plug and play model of operation, since this equipment has in the past been based on Time-Division Multiplex (TDM) protocols that do not readily allow types of protocol exchanges required for automated CPE provisioning to take place. However, as transport networks evolve to support packet switching, this traditional limitation need not apply. One embodiment of a transport network that can support a plug and play model of provisioning is the Packet Aware Transport Network (PATN) Architecture that is the subject of a US patent application filed on Mar. 26, 2004 with Ser. No. 10/810,326, which is herein incorporated by reference.

Therefore, a need exists for a method and apparatus for supporting automated "plug and play" provisioning to be extended to include transport CPE in the PATN Architecture.

SUMMARY OF THE INVENTION

In one embodiment, the present invention extends the traditional transport CPE in the PATN Architecture to support automated "plug and play" provisioning for both circuit and packet traffic. For example, the present invention employs a method that involves initializing CP-MSP and P-MSS transport connection, initializing CP-MSP packet connection to OSS, provisioning the CP-MSP, and performing service activation.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
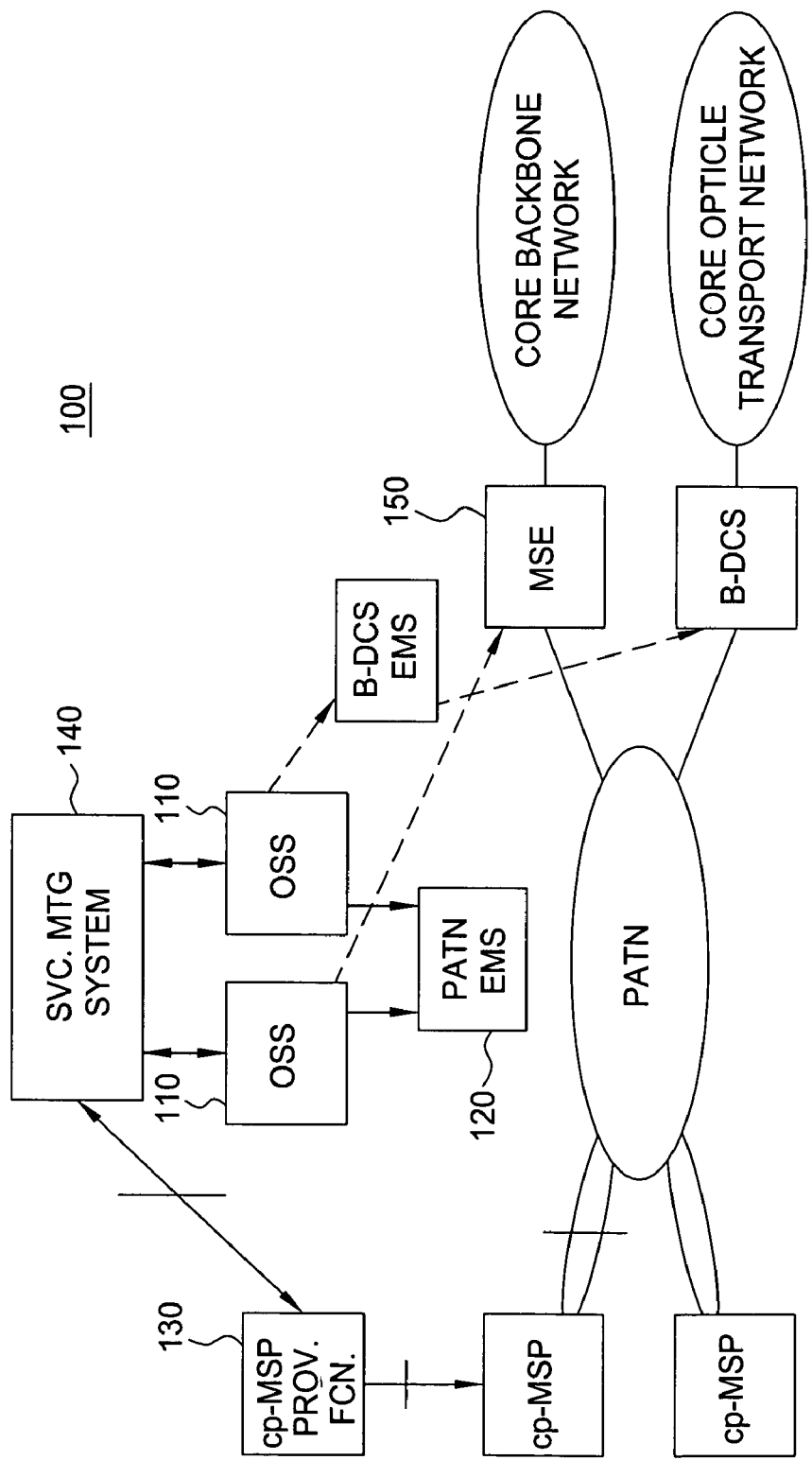
FIG. 1 illustrates a generic diagram of an Operations Support System (OSS) architecture supporting "plug and play" provisioning.

The purpose of the access network is to provide transport of customer traffic from the customer premises to the network of a service provider, e.g., the AT&T network. Today, customer access is achieved via a TDM network, carried as asynchronous mapped nxDS0, DS1 and DS3, or synchronous mapped SONET STS-1, OC-3, OC-12, and OC-48 signals, with TDM interfaces between ILEC/CLEC and AT&T. With the introduction of a converged Multi Protocol Label Switching (MPLS) core network, a new set of functionality is needed to extend the "packet awareness" to the access and Metro domains. The PATN technology, which will be predominantly deployed in the access-Metro regions, will support "packet-awareness" functionality, encapsulation, and transport of Layer 2 (L2) data traffic to the Multi-Service Edge (MSE) and core MPLS network and support a suite of L2 services within the Metro domain. The PATN technology will effectively move the SONET/DS3/DS1 TDM terminations from MSE to the Point of Presence (PoP), Local Serving Office (LSO), and to the customer premise, while creating new service capability such as Ethernet Virtual Circuits (EVC) and Virtual Private LAN (Local Area Network) service (VPLS). It is envisioned that the packet-aware transport is based on MPLS L2 encapsulation and transport within the PATN domain. Key to this implementation will be support for virtual circuits independent of the protocol and interface to the customer (or third party access provider) and aggregated interface to a service provider's MSE and core MPLS networks.

PATN technology and its associated architecture will support all existing customer connections and, at the same time, enable new services. The three sets of envisioned PATN architectural capabilities are: "Packet-TDM interface", "Packet transport", and "MPLS interface to the MSE".

The purpose of the Packet-TDM Interface is to move the TDM interfaces from the MSE to the PATN and achieve improved fill efficiency at the MSE interfaces. The packet TDM interface will:

Terminate the TDM signal;

Detect and extract packets/cell/frames;

Suppress idle packets/cells/frames;

Encapsulate only customer payload traffic into Virtual Circuits;

Statistically multiplex virtual circuits

The purpose of the Packet transport capability is to aggregate/segregate various streams and types of packet traffic. The PATN provides efficient transport of packet services to the MSE while directly supporting switched Ethernet services and private line TDM services.

The MPLS interface to the MSE concept of the PATN includes the following capabilities:

Allow the transport of L2 Virtual Circuits as MPLS Label Switched Paths between the PATN and the MSE customer-side ports;

Support flow-through provisioning of the PATN based on MSE service attributes including service quality, bandwidth guarantees, latency, and end-to-end restoration;

Support dynamic re-homing through the PATN towards a different MSE.

To better understand the present invention, a description of the components of a PATN network and its associated Operations Support System (OSS) architecture are first provided below.

FIG. 1 provides an exemplary PATN Operations Support System (OSS) architecture 100 that shows the functional relationships and key interfaces between OSS 110 and Element Management System (EMS) that support "plug-and-play" provisioning. The OSSs contain network inventory for PATN/MSE/B-DCS (e.g. available ports) and port-to-customer mapping. The PATN EMS 120 is responsible for PATN provisioning and routing within PATN. It also separates sub-networks that may be supported by different EMS's (i.e., multi-vendor by sub-network). The CP-MSP provisioning function 130 contains cp-MSP inventory (by site) and mapping to PATN port, communicates directly with cp-MSP via management channel, retrieves CP-MSP hardware and software configuration at initialization, and generates CP-MSP service provisioning data to add/modify service. The Service Management System (SMS) 140 coordinates end-to-end service provisioning workflow, such as a connection from a near-end CP-MSP through a near-end PATN and then through a near-end Multi-Service Edge (MSE) 150 to a far-end MSE connecting to a far-end PATN and then connecting to a far-end CP-MSP.

Figure 2:
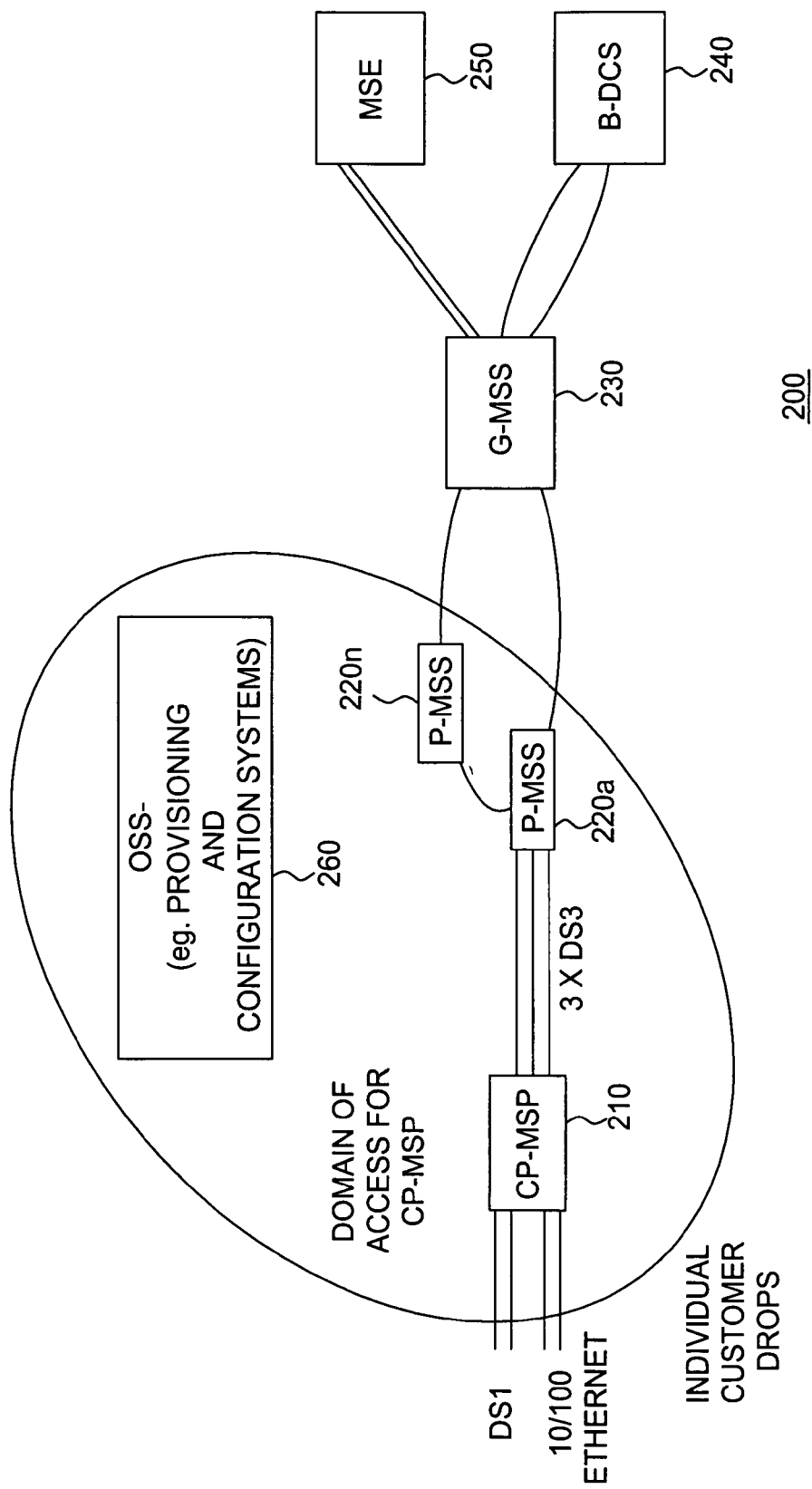
FIG. 2 illustrates a block diagram of a PATN communication network.

FIG. 2 shows an exemplary PATN communication network 200. The PATN network 200 comprises a Customer Premise-Multi-Service Platform (CP-MSP) 210, a plurality of Packet-Multi-Service Switch (P-MSS) 220a-n, a Gateway-Multi-Service Switch (G-MSS) 230, and a Broadband-Digital Cross-connect System (B-DCS) 240.

Additionally, FIG. 2 also shows OSS components 260, e.g., provisioning and configuration systems. It should be noted that there may be other OSS components that are not shown.

The CP-MSP 210 is a Customer Premise Multi-Service Platform, which provides transport services to one or more customers via customer drop ports, and connects to the PATN network via a range of potential access facilities, such as multiple DS3 facilities shown in FIG. 2. When the service provider has direct fiber access to the building in which the CP-MSP 210 is located, the access facility may use fiber potentially with a packet access technology such as that supported by the IEEE 802.17 standard. Traditional access facilities such as DS3 are important, for example when the service provider does not have fiber access and thereby needs to lease traditional access facilities or has unused facilities in place that can be used to access the CP-MSP.

The P-MSS 220 is a Packet Multi-Service Switch supporting PATN functions described above. In one embodiment, the G-MSS 230 is a P-MSS in a large central office where a significant amount of traffic is aggregated for access to the Multi-Service Edge (MSE) 250 for packet services, or the Broadband Digital Cross-connect System (B-DCS) 240 for traditional transport services.

The CP-MSP 210 interacts via packet protocol exchanges with an OSS that supports provisioning, test and service activation of the transport services provided by the CP-MSP and PATN network. The overall sequence of operations and protocol exchanges required to support provisioning and service activation of the CP-MSP is referred to as the Plug and Play (PnP) process. Note that the CP-MSP engages in packet protocol exchanges with OSSs during the PnP process which are supported via packet service functionality supported by the PATN. It is important to note that this packet service functionality is provided before transport services are provided to the customer (or customers) of the service. The packet services provided during the PnP process may allow only the OSSs to be accessed by the CP-MSP.

The CP-MSP 210 may be pre-provisioned before it is installed at the customer premises with configuration information necessary to support the PnP process. This may include a network address (such as an Internet Protocol address), CP-MSP identifier, and credentials allowing the CP-MSP to be authenticated by the network. In addition, the service provisioning process will result in an order being placed for access facilities (i.e. fiber, DS3, etc.) between the P-MSS and CP-MSP. The PnP process begins once these facilities are in place and the CP-MSP is connected to them.

Traditional transport equipment and OSS have traditionally not been developed to support the PnP model of operation, since this equipment has in the past been based on Time-Division Multiplex (TDM) protocols that do not readily allow types of protocol exchanges required for automated CPE provisioning to take place.

To address this criticality, there exists a need for a method and apparatus for supporting automated "Plug and Play" provisioning to be extended to include transport CPE in the PATN environment.

Figure 3:
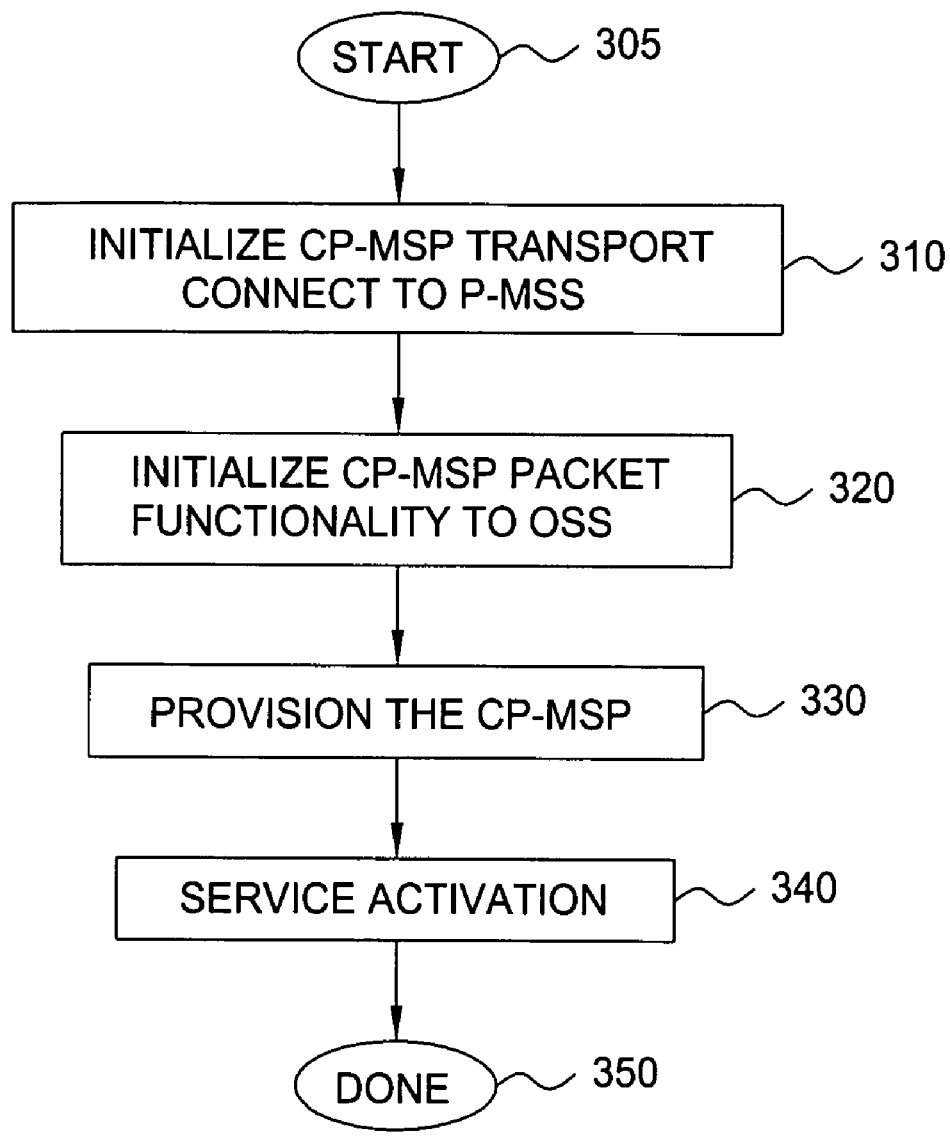
FIG. 3 illustrates an overall flowchart of the Plug and Play provisioning process.
Figure 4:
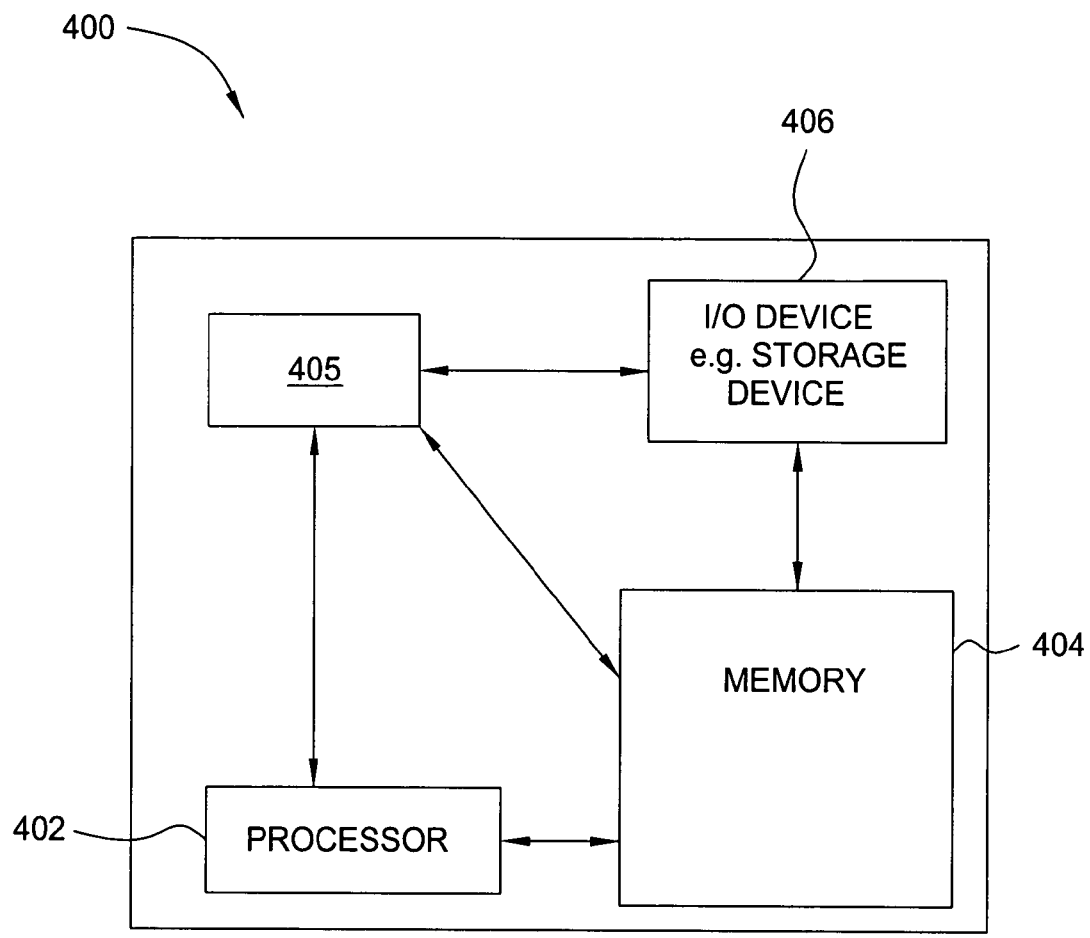
FIG. 4 illustrates the present Plug and Play provisioning and/or configuration process implemented using a general purpose computer or any other hardware equivalents.

FIG. 3 illustrates a flowchart of the overall method 300 for the Plug and Play provisioning process. Method 300 starts in step 305 and proceeds to step 310.

The OSS may perform a "deep discovery" of the configuration of the CP-MSP using a network management protocol such as LMP/SNMP. This process of determining the precise configuration of the CP-MSP (what cards e.g., 10/100 Ethernet, 1G Ethernet, OC-12, OC-192, are on the platform) is important to enable provisioning of services by the customer.

In step 310, the method initializes the CP-MSP transport connection to the P-MSS. This may involve protocols like IEEE 802.17 or Multi-link PPP over DS3. Note that the transport connection may be limited initially to a single link, with the remaining links of a multi-link access connection being brought up before service activation is completed. In order to perform this step, the CP-MSP is pre-provisioned with minimal configuration, including Internet Protocol (IP) address prior to shipment. For instance, the CP-MSP MAC address and/or IP address are provisioned and keyed into database.

In step 320, the method initializes packet service functionality that is used by the CP-MSP to engage in packet exchanges with the OSSs during the rest of the PnP process. The CP-MSP will establish IP connectivity to P-MSS and the P-MSS can in turn provide bootstrap IP access service to the CP-MSP. The established packet service functionality, at this stage, is restricted to enable communications with provisioning and configuration servers. The PATN may provide a Layer 2 packet service (such as a transparent LAN service) to allow the CP-MSP to access the OSS; or the PATN may provide a Layer 3 packet service (such as an Internet Protocol service); or the PATN may provide both Layer 2 and Layer 3 services to support the PnP process. Initialization of the packet service functionality may involve several steps, including the use of the Dynamic Host Configuration Protocol (DHCP) to assign an Internet Protocol address to the CP-MSP, and authentication of the CP-MSP via an authentication protocol. Once the second step is complete, the CP-MSP is able to reach specific OSSs to support PnP. The CP-MSP is also reachable via network management protocols such as the Simple Network Management Protocol (SNMP). The second step may therefore include other exchanges to validate connectivity of the CP-MSP, such as having the CP-MSP send an SNMP "trap" message to an OSS.

In step 330, the method may provision the CP-MSP. CP-MSP is provisioned over the in-band control channel. The preferred embodiment of this step is for the CP-MSP to download a configuration file using a file download protocol such as the Trivial File Transfer Protocol (TFTP). This approach provides significant flexibility, since new services and features can be supported by updating the information in the configuration file. The configuration file includes information such as the services supported by each port of the CP-MSP, and particular parameters relevant to those supported services.

In another embodiment of the present invention of this step, every CP-MSP can be configured identically and a predefined TL1 script is executed on the CP-MSPs (upon boot up) to provision it. In another embodiment of the present invention, the network operator can create node specific scripts with parameters (based on IP address) to be executed at CP-MSP. For instance, all ports except the uplink port on CP-MSP are disabled initially. This approach allows a service provider to retain control on what services may be setup by customer with zero-touch provisioning. The CP-MSP configuration file contains service related information and parameters related to each CP-MSP service port such as:

Service type
    DS1 private line, DS1 frame relay, Ethernet virtual circuit, Ethernet port mapped, Ethernet VLAN-to-VC, and Transparent LAN service
Remote tunnel endpoint address
Forward/do not forward flag that enables data plane access or allow only management plane access
Ethernet parameters
    VLAN translation/mapping information
    Bandwidth allocation
    QoS mapping information (i.e. 802.1p, Diffserv)
Private line transport parameters In step 340, the method may perform service activation. In one embodiment of this step, the CP-MSP dynamically requests the P-MSS to set up MPLS connections ("tunnels") to the appropriate node and service access point using a dynamic signaling protocol such as Resource Reservation Protocol-Traffic Engineering (RSVP-TE). The CP-MSP obtains the information needed to set up these connections via step 330, for example as information in the configuration file. The CP-MSP may set up a connection to another CP-MSP to support a point-to-point service, such as an Ethernet Virtual Circuit service or traditional private line service. Alternatively, the CP-MSP may set up a connection to the MSE to support Ethernet access to wide-area Internet or Virtual Private Network services. Alternatively, the CP-MSP may set up a connection to a specific Service Access Point within the P-MSS that provides Layer 2 Ethernet bridging services within the metro area. Alternatively, the CP-MSP may set up a connection to the B-DCS to access wide-area private line services.

The connection may have multiple parameters specified: CIR, EIR, Class of Service. These are also settable by the customer, and have to be checked by the OSS to see if the customer is allowed to set this up.

Note that the service activation step requires other network elements to be provisioned in addition to the CP-MSP. For example, when the CP-MSP connects to the MSE, the MSE must be provisioned (or pre-provisioned) with the relevant IP service information to support the particular customer that is connected to the CP-MSP port that is being connected to the MSE. This description assumes that the OSSs coordinate this pre-provisioning step. The primary mechanism required for the current invention is that the endpoint that receives an incoming setup request from a CP-MSP must be able to "bind" the incoming setup request to the pre-provisioned service information. For example, assume that the MSE receives the setup request. The "binding" process can be accomplished using a common identifier in the setup request that is known to both the CP-MSP and the MSE. The OSSs coordinating the provisioning process can be responsible for selecting this common identifier and supplying it to both the MSE (via pre-provisioning) and the CP-MSP (via the configuration file that it downloads). The method 300 then terminates in step 350.

It should be noted that the present Plug and Play provisioning and/or configuration process can be implemented in software and/or in a combination of software and hardware, e.g., using application specific integrated circuits (ASIC), a general purpose computer or any other hardware equivalents. For example, the present Plug and Play provisioning and/or configuration process can be implemented in a system 400 having a processor element 402 (e.g., a CPU), a memory 404, e.g., random access memory (RAM) and/or read only memory (ROM), and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)). As such, the present Plug and Play provisioning and/or configuration process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for automated provisioning of a customer premise-multi-service platform (CP-MSP) supporting both circuit and packet traffic in a multi-service network environment having at least one Packet Multi-Service Switch (P-MSS), comprising:
    initializing a transport connection between the CP-MSP to the at least one P-MSS;
    initializing at least one CP-MSP packet service functionality to at least one operation support system (OSS), wherein said initializing said at least one CP-MSP packet service functionality comprises:
        establishing an Internet Protocol (IP) connectivity to the at least one P-MSS by the CP-MSP;
        providing a bootstrap IP access service to the CP-MSP by the at least one P-MSS; and
        restricting CP-MSP communications to one or more OSS components; and
    provisioning the CP-MSP.

2. A method for automated provisioning of a customer premise-multi-service platform (CP-MSP) supporting both circuit and packet traffic in a multi-service network environment having at least one Packet Multi-Service Switch (P-MSS), comprising:

initializing a transport connection between the CP-MSP to the at least one P-MSS;
initializing at least one CP-MSP packet service functionality to at least one operation support system (OSS); and
provisioning the CP-MSP, wherein said provisioning comprises:
   downloading a configuration file using a file download protocol, wherein said configuration file comprises information and parameters related to one or more CP-MSP service ports.

3. A method for automated provisioning of a customer premise-multi-service platform (CP-MSP) supporting both circuit and packet traffic in a multi-service network environment having at least one Packet Multi-Service Switch (P-MSS), comprising:
   initializing a transport connection between the CP-MSP to the at least one P-MSS;
   initializing at least one CP-MSP packet service functionality to at least one operation support system (OSS);
   provisioning the CP-MSP; and
   activating one or more services associated with said at least one CP-MSP packet service functionality, wherein said activating comprises:
      dynamically requesting the at least one P-MSS by the CP-MSP to set up Multi Protocol Label Switching (MPLS) connections to a node or a service access point.

4. The method of claim 3, wherein said dynamically requesting uses a dynamic signaling protocol.

5. The method of claim 4, wherein said dynamic signaling protocol is Resource Reservation Protocol-Traffic Engineering (RSVP-TE).

* * * * *